United States Patent [19]

Skarstad et al.

[11] 4,278,745  
[45] Jul. 14, 1981

[54] CATHODE MATERIALS FOR ELECTROCHEMICAL CELLS

[75] Inventors: Paul M. Skarstad, Wayzata; Darrel F. Untereker, Cedar; Arthur J. Coury, St. Paul, all of Minn.

[73] Assignee: Medtronic, Inc., Minneapolis, Minn.

[21] Appl. No.: 124,082

[22] Filed: Feb. 25, 1980

[51] Int. Cl.³ .............................................. H01M 4/60
[52] U.S. Cl. .................................. 429/213; 252/182.1
[58] Field of Search ............... 429/191, 192, 213, 218, 429/199; 252/182.1

[56] References Cited

U.S. PATENT DOCUMENTS

| | | | |
|---|---|---|---|
| 3,660,163 | 5/1972 | Moser | 136/83 R |
| 3,660,164 | 5/1972 | Hermann et al. | 136/83 R |
| 3,895,962 | 7/1975 | Mead | 136/83 R |
| 4,010,043 | 3/1977 | Schneider | 29/523.2 |
| 4,148,975 | 4/1979 | Schneider et al. | 429/213 |

OTHER PUBLICATIONS

NASA Tech. Brief No. 66-10682, Dec. 1966, Clearinghouse for Federal Scientific and Technical Information, Springfield, Va.

Gutmann et al., Solid-State Electrochemical Cells Based on Charge Transfer Complexes, J. Electrochemical Soc., pp. 323–329, vol. 114, No. 4, Apr. 1967.

Primary Examiner—Donald L. Walton  
Attorney, Agent, or Firm—Schroeder, Siegfried, Ryan, Vidas, Steffey & Arrett

[57] ABSTRACT

Novel cathode materials for use in electrochemical cells are disclosed. The cathode materials consist essentially of a conductive solution comprised of iodine dissolved in a mixture of two organic pyridine-based constituents, both of which function as donors to form complexes with iodine. Preferably, the cathode materials further include, in addition to the dissolved iodine, an iodine solid phase suspended therein. Large amounts of the iodine solid phase, relative to the dissolved iodine, may be used.

23 Claims, 2 Drawing Figures

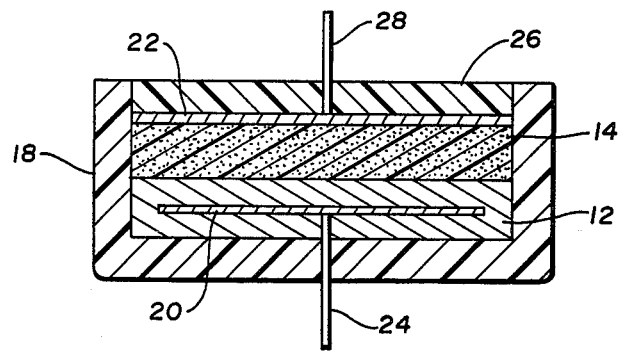
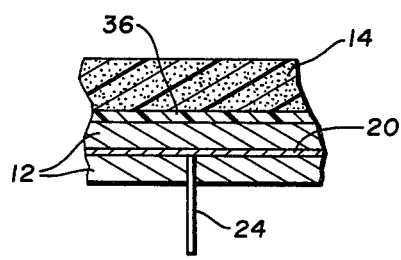

CATHODE MATERIALS FOR ELECTROCHEMICAL CELLS

I. DESCRIPTION

BACKGROUND OF PRIOR ART

The invention relates generally to electrochemical cells, batteries in particular, and specifically to improved cathode materials therefor. The cathodes are particularly intended for use in implantation in the human body to operate electrical devices such as cardiac pacemakers and the like. However, other applications such as in small cells for low current drain use generally are also within the purview of this invention.

The invention is of specific interest in connection with batteries, such as lithium anode batteries, incorporating iodine-complex cathodes. Such cathodes have also been referred to as iodine-containing charge-transfer compounds. Charge-transfer compounds are sometimes referred to as complexes and sometimes as donor-acceptor compounds. The iodine in such a cathode reacts electrochemically with the battery anode, lithium for example, to provide an electrical current. This reaction causes an iodide electrolyte to form in situ between the anode and cathode. The charge-transfer donor typically used has been a polyvinylpyridine such as poly-2-vinylpyridine or poly-4-vinylpyridine. U.S. Pat. Nos. 3,660,163 to Moser, 3,660,164 to Hermann et al and 3,674,562 to Schneider et al describe examples of such batteries.

In these kinds of batteries, it has been determined that additional amounts of free iodine, i.e., excess iodine which is in a substantially separate phase from the charge-transfer donor, may be included as part of the cathode material to provide an iodine "reservoir" for the battery to draw on during discharge. The additional iodine increases the useful life of the battery.

BRIEF SUMMARY OF THE INVENTION

The invention is not, in its broad aspects, directed to any particular cell or battery design but rather to an improved group of cathode materials as described herein for use in combination with any electrochemical cell design or structural arrangement. In physical arrangement, it is only required that the anode and cathode means of the cell, including the cathode material of the invention, be placed in operative relationship with each other, in the broadest sense.

Generally, the improved cathode materials of the invention comprise a mixture of two organic constituents and iodine. Preferably, the mixture is viscous. The materials exhibit improved uniformity of electrical properties over iodine-complex cathode materials of the prior art.

This invention also constitutes an improvement over that disclosed in copending application Ser. No. 34,266, filed Apr. 30, 1979, now U.S. Pat. No. 4,210,706 which is assigned to the same assignee as this invention is assigned. The entire content of that patent application is incorporated herein by reference.

In that aforementioned patent application, cathode materials are disclosed which comprise in combination an organic component, capable of forming a liquid solution with iodine at normal human body temperature i.e., about 37° C., and dissolved iodine. Additionally, these organic components are electron donors and form complexes with the iodine. The materials may also comprise two-phase liquid-solid compositions in which the liquid phase is a saturated solution and the solid phase is additional iodine. The organic component generally comprises a pyridine derivative which forms a conductive liquid when mixed with iodine. The amount of iodine required will ordinarily be in excess of the amount required to form a complex with the organic component. The organic component may or may not be a liquid itself. Preferably, the organic component will be those selected from the following pyridine derivatives: monomeric substituted pyridines, dimeric substituted pyridines, monomeric quinoline, monomeric substituted quinolines, trimeric substituted pyridines, and mixtures thereof.

The cathode materials described above are conductive due to the liquid phase. The conductivity of the liquid phase is typically on the order of about $10^{-2}(ohm-cm)^{-1}$ at ambient temperature, when saturated with iodine. The relative proportions of organic component and iodine in the saturated solution will be at least about three moles of iodine to each mole of pyridine rings in the organic component. Any amount of excess solid phase iodine i.e., greater than the amount necessary to form the saturated solution of the liquid phase may be used to form the two phase material, so long as the resultant material retains sufficient conductivity for its intended purpose. For example, in a high capacity cell intended for use with long-term, low-drain, medical devices, the amount of excess iodine found satisfactory has been about 4–8 moles of iodine per mole of pyridine rings (i.e., 4–8:1) in the organic component and even higher (i.e., as high as 20–40). This is directly applicable to the invention described herein.

This invention utilizes these pyridine derivatives as a first constituent for a cathode material. The first constituent is mixed with a second pyridine-based organic constituent. Iodine, in varying amounts, comprises third and optional fourth constituents of the cathode material, the third being iodine in solution and the fourth being excess solid iodine.

BRIEF DESCRIPTION OF THE DRAWINGS

FIG. 1 comprises a schematic showing of a typical electrochemical cell utilizing cathode materials of the invention.

FIG. 2 is a fragmentary showing of a portion of FIG. 1 showing a modification which may be used with the invention.

DETAILED DESCRIPTION OF THE INVENTION

As already noted, this invention improves the above-described liquid organic/iodine cathode materials by introducing another or second organic constituent into the material. Specifically, the additional constituent is selected from the group consisting of: pyridine-based polymers which form iodine complexes, e.g., poly-2-vinylquinoline, poly-2-vinylpyridine, poly-4-vinylpyridine, poly-2-methyl-5-vinylpyridine, copolymers thereof, and pyridine, 1,2-bis(4-pyridyl)ethylene; 1,2-bis(2-pyridyl)ethylene; 2,2'-dipyridyl; 4,4'-dipyridyl and 2,4'-dipyridyl and mixtures thereof, all of which also form complexes with iodine. An additional constituent, taken from this group and mixed with a pyridine derivative, as previously described, and iodine, provides a cathode material of more uniform electrical characteristics without degrading the percent utilization of the iodine.

Consequently, the present invention generally provides an improved cathode material comprised of a mixture of constituents including a first constituent (1) a pyridine derivative which forms a conductive liquid when mixed with iodine (see examples in Table 1 below), a second constituent (2) pyridine, a pyridine-based polymer as set forth above or: 1,2-bis(4-pyridyl)ethylene; 1,2-bis(2-pyridyl)ethylene; 2,2'-dipyridyl; 4,4'-dipyridyl; 2,4'-dipyridyl or mixtures thereof, a third constituent (3) dissolved iodine complexes with the constituents (1) and (2) and uncomplexed dissolved iodine, and a fourth constituent (4) optionally, excess undissolved iodine.

TABLE 1

| Pyridine Derivatives | Type | |
|---|---|---|
| 2-ethylpyridine | Substituted | pyridine |
| 4-ethylpyridine | Substituted | pyridine |
| 2-methoxypyridine | Substituted | pyridine |
| 2-aminopyridine | Substituted | pyridine |
| 2-dimethylaminopyridine | Substituted | pyridine |
| 2-methylpyridine | Substituted | pyridine |
| 3-methylpyridine | Substituted | pyridine |
| 4-methylpyridine | Substituted | pyridine |
| 2-ethylpyridine | Substituted | pyridine |
| 4-ethylpyridine | Substituted | pyridine |
| 2-vinylpyridine | Substituted | pyridine |
| 4-vinylpyridine | Substituted | pyridine |
| 2-chloropyridine | Substituted | pyridine |
| 3-chloropyridine | Substituted | pyridine |
| quinoline | | |
| 2-methylquinoline | Substituted | quinoline |
| 4-methylquinoline | Substituted | quinoline |

In accordance with the invention, then, iodine and the selected organic constituents, as previously set forth, are mixed together to provide improved cathode materials.

Preferably, sufficient iodine is included in the cathode material to provide a saturated solution in the pyridine derivative constituent. For example, about a 3:1 or 4:1 mole ratio of iodine ($I_2$) per pyridine ring in the pyridine derivative will form a saturated conductive solution. As shown by way of example in Table 2, saturated solutions of iodine in the pyridine derivatives of the group set forth for the invention require at least about three moles or more of iodine ($I_2$) per mole of pyridine rings in the organic component to form the conductive saturated solutions of the invention.

TABLE 2

| Examples of saturated solutions of Organic + $I_2$ (mole ratios) | |
|---|---|
| Pyridine Derivative Constituent | Moles $I_2$/Mole or Pyridine Rings in the Component |
| 2-ethylpyridine | 4.0 |
| 2-vinylpyridine | 2.75–3.3 |
| 2-methoxypyridine | 3.8 |
| 2-dimethylaminopyridine | 3.9 |
| 2,6-diaminopyridine | 4.0 |
| 4-ethylpyridine | 3.8 |
| quinaldine (2-methylquinoline) | 4.0 |

As already pointed out, the presence of a solid phase of iodine in the cathode material, schematically indicated in FIG. 1, in addition to the iodine dissolved in the solution, is preferably used to form the cathode materials of the invention. That is, additional amounts of iodine in excess of the preferred saturated solution amounts are most preferably used. The primary purpose of utilizing additional amounts of iodine, over and above those amounts needed to form saturated solutions in the pyridine derivative constituent, is to increase the capacity of the cell in which the cathode material is used.

The upper limit on the amount of solid iodine which can be used relative to the amount of organic component in the liquid phase is that amount of iodine which will cause the conductivity of the composite material to be lower than that required for any particular intended use, such as below about $10^{-4}(\text{ohm-cm})^{-1}$ for example.

FIG. 1 comprises an electrochemical cell battery having a lithium anode 12 and a viscous cathode 14 with excess solid iodine, according to the invention, contacting anode 12. The anode and cathode are disposed within an electrically insulating housing 18 and cover 26. The anode and cathode are respectively contacted by current collectors 20 and 22, which may for example be Hastelloy C or stainless steel. Other materials may be used as are known in this art e.g., zirconium for the anode collector and nickel or platinum for the cathode collector. Current collectors 20 and 22 preferably take the form of a mesh or screen. Attached to current collectors 20 and 22, as by welding, are electrical leads 24 and 28, respectively. The electrical leads are sealed where they pass through housing 18 and cover 26 as by molding them into the housing and cover or by using an adhesive. Ultrasonic welding is also used to seal cover 26 to housing 18 and the unit may then be potted or placed in a sealed stainless steel container (not shown) or the like.

Housing 18 and cover 26 may be of an inert plastic material, e.g., Halar, a trademark of the Allied Chemical Company. It is a proprietary chlorofluropolymer material. On the other hand, the housing and cover may be of any insulative material not substantially reactive with the cell components to be contained therein.

While lithium is the preferred anode material for use with the invention and is disclosed in the specific examples set forth herein, lithium-rich alloys such as lithium-magnesium or lithium-calcium and the like, and other anode metals such as silver, which form ionically conductive iodides, may also be used.

In practice, various cell designs and component materials may be used with the improved cathode materials of the invention, the cell of FIG. 1 merely being illustrative of one type of cell and combination of materials. Materials for the cell components may be selected from any number of a wide variety of conventional materials known in the electrochemical art, particularly in the battery art.

FIG. 2 shows a modification of the cell structure of FIG. 1 which is used in more preferred embodiments. The cell includes a body or film 36 of poly-2-vinylpyridine polymer carried on the operative surface of anode 12, the operative surface being that surface which normally contacts the cell cathode, at least initially, for interaction therewith. Such an arrangement is more particularly described in U.S. Pat. Nos. 4,182,798; 4,071,662; 3,957,533; and 3,957,635.

Cells of the type described herein require no separate electrolyte component as initially constructed. Consequently, no electrolyte per se is shown in the Figures. However, following assembly, an electrolyte does form in situ. The electrolyte builds up between the cathode and the anode, usually taking the form of a layer, initially due to the direct reaction between the anode metal and the iodine of the cathode material and subsequently as the product of the electrochemical discharge of the aforementioned components. For example, in a cell having a lithium anode, lithium iodide electrolyte will form on the anode. Other anode metals will form corresponding iodides.

Table 3 shows an array of preparation temperatures and first/second organic constituent mixtures which are exemplary of preferred embodiments of the cathode materials of the invention.

TABLE 3

| First Constituent (Pyridine derivative) A | Second Constituent (Pyridine or pyridine polymer, etc.) B | Relative Amount First/ Second Constituents A/B | preparation Temperatures | | | |
|---|---|---|---|---|---|---|
| | | | 80° | 140° | 200° | 300° |
| 2VP* | P2VP* | | | | | |
| | | .67/.33 | X | X | X | |
| | | .50/.50 | X | X | X | X |
| | | .33/.67 | X | X | X | |
| 2EP* | P2VP* | | | | | |
| | | .50/.50 | X | | | X |
| | | .33/.67 | X | | | |
| | | .17/.83 | X | | | |
| 2EP:Pyridine | — | .50/.50 | X | | | |
| 4EP* | P4VP* | .50/.50 | X | | | |

*2VP = 2-vinylpyridine
P2VP = poly-2-vinylpyridine
4VP = 4-vinylpyridine
4EP = 4-ethylpyridine
P4VP = poly-4-vinylpyridine

EXAMPLES FROM TABLE 3

Cathode Preparation

Each A/B mixture of Table 3 was mixed with 8 parts $I_2$ by weight in a glass ampule. The ampules were evacuated and sealed. The 80° samples were initially briefly heated to 120° C. in the rocking furnace. All the sealed ampules were then heated in a rocking furnace at their respective preparation temperatures for 24 hours. After reaction, the 8:1 (by wt.) preparations were mixed well with finely milled iodine to make the overall composition 50:1 (by wt.) with respect to iodine.

Cell Construction

Lithium anode cells for discharge were constructed in a polypropylene cell container. The anode area was 5.1 cm². Approximately 1 g. of 50:1 iodine:A/B mix (by wt.) was used in each cell giving a nominal stoichiometric capacity of 0.21 ampere-hours. The cells were potted in polyester, each in a metal can. The cans were then hermetically sealed. Cell discharge as reported herein was at 37° C. under a constant 10 KΩ resistive load.

Discharge Data

Mean % utilizations and standard deviations for several sets of test cells are shown in Table 4. Two features of these results are immediately obvious. First, all of the cathode preparations perform quite well, with mean utilizations in the range 85%–92%. The second notable feature is the consistency of the data. Note the consistency in the utilizations obtained for the cells as evidenced by standard deviations in the percent utilization.

TABLE 4

MEAN % UTILIZATION FOR TEST CELLS*

| A/B | RATIO | MEAN % UTILIZATION AND PREPARATION TEMPERATURES | | |
|---|---|---|---|---|
| | | 80° | 140° | 200° |
| 2VP/P2VP | 67/33 | 89(2)** | 89(1) | 86(2) |
| 2VP/P2VP | 50/50 | 87(3) | 90(2) | 86(2) |
| 2VP/P2VP | 33/67 | 85(2) | 85(4) | 89(2) |
| 2EP/P2VP | 50/50 | 78 | | |
| 2EP/P2VP | 33/67 | 88(2) | | |
| 2EP/P2VP | 17/83 | 87(1) | | |
| 2EP/Pyridine | 50/50 | 86(3) | | |
| 4EP/P4VP | 50/50 | 92(2) | | |
| 4VP/P4VP | 50/50 | 91(3) | | |

*a. Mean % of total iodine utilized to a cutoff voltage of 100mV under a load of 10KΩ.
**b. Standard deviations in parentheses apply to the final digit in all cases.

GENERAL

Generally, it is preferred, in accordance with this invention, that the first organic constituent be present in an amount of at least about 5% by weight relative to the amount of the second organic constituent. However, as the data demonstrate, a wide range of relative amounts of these two constituents may be used in the cathode materials of this invention. The data disclose amounts of the first constituent ranging from 17–67% relative to the second constituent in order to demonstrate the wide range of mixtures of the two organic constituents which may be used. In the final analysis, the relative amounts used in any particular instance will depend on the end-use of the cell or battery in which the cathode material is to be incorporated.

The starting materials utilized herein were sourced as follows. For example, the pyridine derivatives are available from Reilly Tar & Chemical Corporation, Indianapolis, Ind., and Aldrich Chemical Co., Milwaukee, Wis. The P2VP was obtained from Ionac Chemical Co., Birmingham, Ala., and the P4VP is available from Polysciences, Inc., Warrington, Pa.

The cathode material, after mixing of the constituents, may be formed into a pellet or the like by pressing at ambient temperature or it may be heated above the liquidus temperature. If the latter preparation technique is used, any type of iodine may be incorporated into the cathode material. If the former preparation technique is used, certain considerations are preferably taken into account regarding the particulate nature of the iodine, as described below.

Iodine, being a particulate material, may be used in either a coarse particle form or a finely divided particle form, such as iodine which has been milled to a powder. It is preferred that finely divided iodine, such as that which is obtained by the electric milling of iodine, be used in cells of this invention if the cathode material is prepared without melting. Finely divided iodine allows for accelerated testing to evaluate the complete discharge characteristics of the cells because of the ready dissolution of finely divided iodine in the cathode liquid phase due to its high surface area. Thus, the more finely divided, the better.

Heat may be applied to the mixture at various stages of its preparation, either above or below liquidus, in forming the cathode material. However, it is not ordinarily necessary for most combinations. It is, however, generally preferable to use heat to react the organic constituents and initial amounts of iodine. Additional amounts of iodine may then be added with or without heat.

Care should be taken, with all of the materials described herein to protect them against the presence of significant amounts of moisture. This may be accomplished by preparing and maintaining various cell components including the cathode materials in a dry box having an atmosphere such as dried helium or in a dry room.

Having described the invention, the exclusive property rights claimed are defined as follows:

1. As a cathode material for electrochemical cells, a combination consisting essentially of a conductive mixture comprising a first constituent selected from the group consisting of monomeric substituted pyridines, dimeric substituted pyridines, derivatives of dimeric substituted pyridines, monomeric quinoline, monomeric substituted quinolines, trimeric substituted pyridines, derivatives of trimeric substituted pyridines and mixtures thereof; a second constituent selected from the group consisting of poly-2-vinylpyridine; poly-4-vinylpyridine; poly-2-vinylquinoline; poly-2-methyl-5-vinylpyridine; copolymers thereof; pyridine; 1,2-bis(4-pyridyl)ethylene; 1,2-bis(2-pyridyl)ethylene; 2,2'-dipyridyl; 4,4'-dipyridyl; 2,4'-dipyridyl, and mixtures thereof, and a third constituent comprising iodine.

2. The cathode material of claim 1 wherein the first constituent is substantially saturated with iodine.

3. The cathode material of claim 1 including excess solid iodine.

4. The cathode material of claim 1 wherein the first constituent is present in an amount of at least about 5% by weight relative to the second constituent.

5. The cathode material of claim 1 wherein the first and second constituents are respectively selected from the group consisting of 2-vinylpyridine and poly-2-vinylpyridine, 2-ethylpyridine and poly-2-vinylpyridine, 2-ethylpyridine and pyridine, 4-vinylpyridine and poly-4-vinylpyridine, and 4-ethylpyridine and poly-4-vinylpyridine.

6. The cathode material of claim 5 wherein the first constituent is substantially saturated with iodine.

7. The cathode material of claim 5 including excess solid iodine.

8. The cathode material of claim 5 wherein the first constituent is present in an amount of at least about 5% by weight relative to the second constituent.

9. An electrochemical cell comprising an anode and a cathode in operative relationship, the cathode comprising a combination consisting essentially of a conductive mixture comprising a liquid-iodine-complex-forming first constituent selected from the group consisting of monomeric substituted pyridines, dimeric substituted pyridines, derivatives of dimeric substituted pyridines, monomeric quinoline, monomeric substituted quinolines, trimeric substituted pyridines, derivatives of trimeric substituted pyridines, and mixtures thereof; an iodine-complex-forming second constituent selected from the group consisting of poly-2-vinylpyridine; poly-4-vinylpyridine; poly-2-vinylquinoline; poly-2-methyl-5-vinylpyridine; copolymers thereof; pyridine; 1,2-bis(4-pyridyl)ethylene; 1,2-bis(2-pyridyl)ethylene; 2,2'-dipyridyl; 4,4'-dipyridyl; 2,4'-dipyridyl, and mixtures thereof and a third constituent comprising iodine.

10. The cell of claim 9 wherein the first constituent is substantially saturated with iodine.

11. The cell of claim 9 wherein the cathode material includes excess solid iodine.

12. The cell of claim 9 wherein the anode is lithium.

13. The cell of claim 9 wherein the anode is a lithium-rich alloy.

14. The cell of claim 9 wherein the anode is silver.

15. The cathode material of claim 9 wherein the first constituent is present in an amount of at least about 5% by weight relative to the second constituent.

16. The cell of claim 9 wherein the first and second constituents of the cathode material are respectively selected from the group consisting of 2-vinylpyridine and poly-2-vinylpyridine, 2-ethylpyridine and poly-2-vinylpyridine, 2-ethylpyridine and pyridine, 4-vinylpyridine and poly-4-vinylpyridine, and 4-ethylpyridine and poly-4-vinylpyridine.

17. The cell of claim 16 wherein the first constituent is substantially saturated with iodine.

18. The cell of claim 16 wherein the cathode material includes excess solid iodine.

19. The cathode material of claim 16 wherein the first constituent is present in an amount of at least about 5% by weight relative to the second constituent.

20. As a cathode material for electrochemical cells, a combination consisting essentially of a conductive viscous mixture comprising a pyridine derivative as a first constituent, an iodine-complex-forming second constituent selected from the group consisting of vinylpyridine-based polymers; copolymers thereof; pyridine; 1,2-bis(4-pyridyl)ethylene; 1,2-bis(2-pyridyl)ethylene; 2,2'-dipyridyl; 4,4'-dipyridyl; 2,4'-dipyridyl, and mixtures thereof, and a third constituent comprising iodine.

21. The cathode material of claim 20 wherein the first constituent is substantially saturated with iodine.

22. The cathode material of claim 20 including excess solid iodine.

23. The cathode material of claim 20 wherein the first constituent is present in an amount of at least about 5% by weight relative to the second constituent.

* * * * *